J. L. STOLTZ.
RESILIENT WHEEL.
APPLICATION FILED OCT. 15, 1921.

1,430,474.

Patented Sept. 26, 1922.
2 SHEETS—SHEET 1.

John L. Stoltz
INVENTOR

BY Victor J. Evans
ATTORNEY

J. L. STOLTZ.
RESILIENT WHEEL.
APPLICATION FILED OCT. 15, 1921.
1,430,474.
Patented Sept. 26, 1922.
2 SHEETS—SHEET 2.
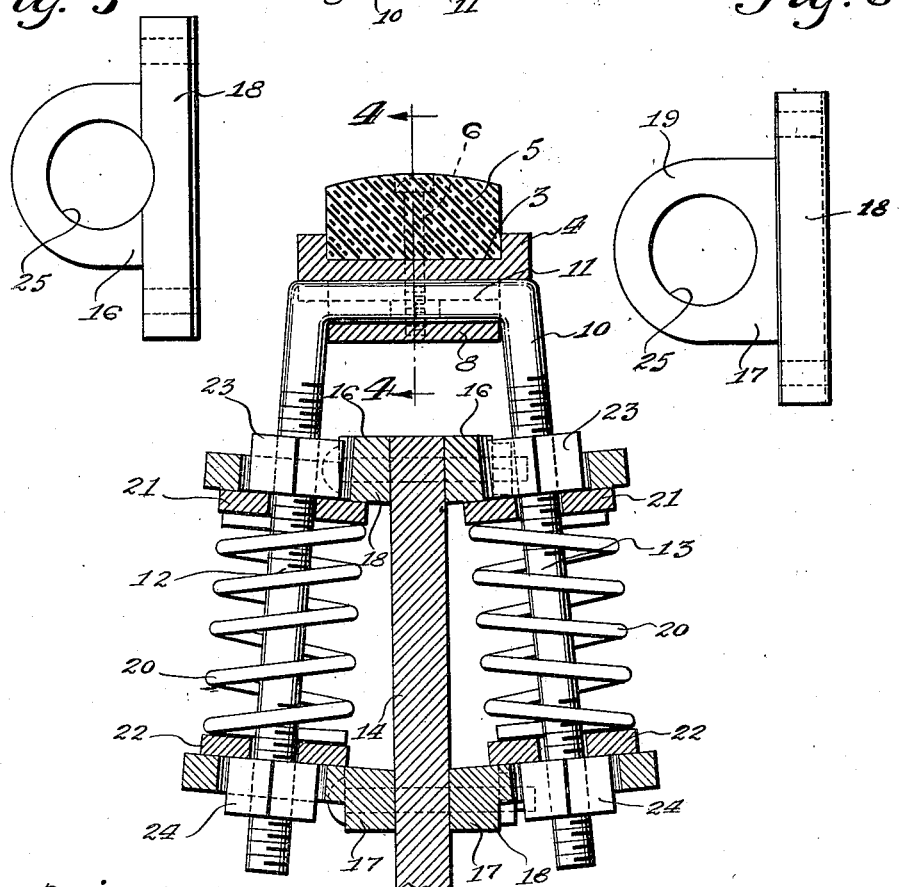
John L. Stoltz
INVENTOR
BY Victor J. Evans
ATTORNEY Patented Sept. 26, 1922.

1,430,474

UNITED STATES PATENT OFFICE.

JOHN L. STOLTZ, OF SUMNER, ILLINOIS.

RESILIENT WHEEL.

Application filed October 15, 1921. Serial No. 507,878.

*To all whom it may concern:*

Be it known that I, JOHN L. STOLTZ, a citizen of the United States, residing at Sumner, in the county of Lawrence and State of Illinois, have invented new and useful Improvements in Resilient Wheels, of which the following is a specification.

This invention relates to vehicle wheels and an object of the invention is to provide a resilient wheel structure particularly designed for use on motor vehicles which structure embodies a rim or tire construction formed of a plurality of pivotally connected sections each of which is yieldably supported in spaced relation to a hub structure, whereby a plurality of springs will always be in weight and vehicle supporting position providing efficient shock absorbing action, which springs are also arranged in such manner that even during side or lateral skidding of the wheel, turning of a corner, a plurality of springs will be acting against pressure applied to the wheel.

A further object of this invention is to provide a resilient wheel structure as specified wherein the shock absorbing proclivities of the springs may be regulated as desired, by regulating the tension of the springs.

Other objects of the invention will appear in the following detailed description taken in connection with the accompanying drawing wherein:

Fig. 3 is a detail section taken on the line 3—3 of Fig. 1.

Fig. 4 is a fragmentary longitudinal section taken on the line 4—4 of Fig. 3.

Figs. 5 and 6 are plan views of guiding and supporting brackets used in the wheel structure.

Figure 1:
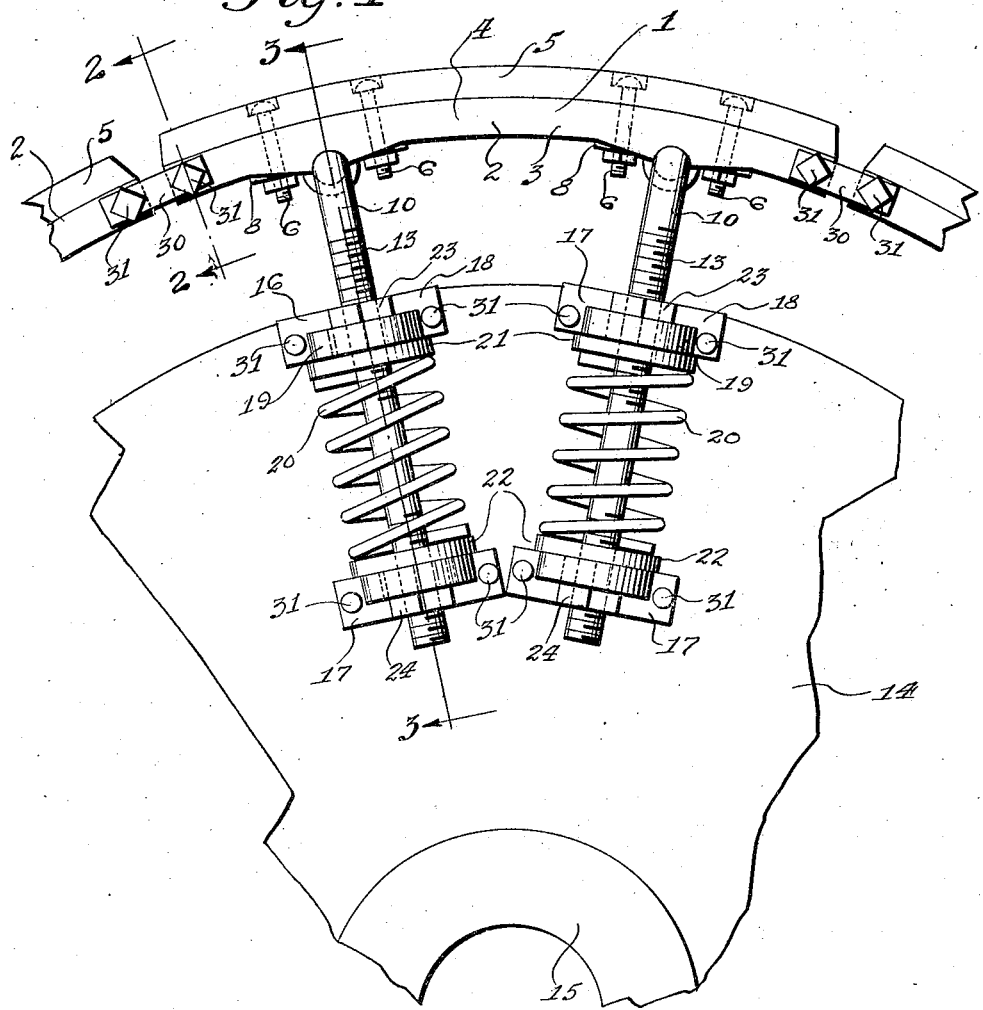
Fig. 1 is a fragmentary side elevation of the improved wheel.
Figure 2:
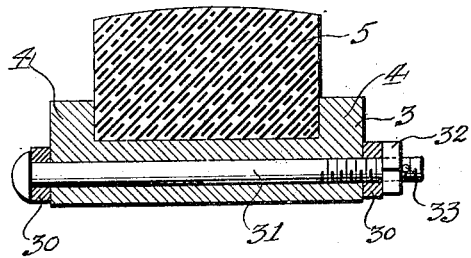
Fig. 2 is a detail section taken on the line 2—2 of Fig. 1.

Referring more particularly to the drawings, the improved resilient wheel comprises a rim structure 1 made up of a plurality of sections 2 each of which sections comprises a rim 3 having flanges 4 thereon which engages along the edges of the resilient tire 5. The tire 5 may be constructed of cushioning rubber or analogous material and the respective sections 3 thereof are connected to the rim sections 3 by bolts 6 which extend radially through the tires 5, rims 3 and through the wings 7 of pivoting brackets 8, connecting the brackets 8 to the rim structure as well as connecting the tire sections 5 to the rim sections. The ends of the various tire sections 2 are disposed in slightly spaced relation as clearly shown in Fig. 1 of the drawings providing shoulders at their ends for increasing the traction of the wheel and preventing circumferential skidding thereof. The brackets 8 form pivots for substantially U shaped bolts 10 the bite portions 11 of which are rockably mounted in the brackets. The legs 12 and 13 of the bolts 10 project inwardly toward the axis of the wheel one upon each side of the disc 14 which is carried by the hub 15 of the wheel. The disc 14 is preferably solid and it has brackets 16 and 17 attached thereto and arranged in pairs at each side of the disc for forming guides for the lengths or legs 12 and 13 of the bolts 10. The guides 16 and 17 comprise relatively long attaching portions 18 and eye or guiding portions 19 which are disposed at obtuse angles to the disc 14 and at right angles to the lengths 12 and 13 of the bolts 10. Cushioning spiral springs 20 are coiled about the lengths 12 and 13 of the bolts 10 and their ends engage against washers 21 and 22 which in turn abut the facing surface of the bearing brackets 16 and 17. Nuts 23 and 24 are threaded upon each of the lengths 12 and 13 and engage the washers 21 and 22 respectively extending through the opening 25 in the brackets 16 and 17. By adjustment of the nuts 23 and 24 the tension of the springs 20 may be regulated for regulating the cushioning or shock absorbing proclivities thereof.

The various tire sections 2 are pivotally connected one to the other by means of connecting plates 30 and bolts 31 which extend transversely through the rim. The nuts 32 upon the threaded ends of the bolts 31 are held against accidental turning movement thereon by transversely extending pins 33.

It is, of course, to be understood that the invention may be constructed in various other manners and the parts associated in different relations, and therefore, I do not desire to be limited in any manner except as set forth in the claims hereunto appended.

Having thus described my invention what I claim is:

1. A resilient wheel comprising in combination a tire structure, a disc, U shape bolts pivotally connected to said tire structure and straddling the edge portion of said disc, and resilient shock absorbing means connecting said bolts to the disc.

2. In a resilient wheel, a tire structure, U shaped bolts pivotally connected to said tire structure, a hub carried disc, the legs of said bolts being mounted upon opposite sides of said disc, springs mounted about said legs, brackets carried by said disc, washers mounted on said bolts and engaging said brackets and springs to provide resilient shock absorbing connection between the tire structure and disc.

3. In a resilient wheel, a tire structure, U shaped bolts pivotally connected to said tire structure, a hub carried disc, the legs of said bolts being mounted upon opposite sides of said disc, springs mounted about said legs, brackets carried by said disc, washers mounted on said bolts and engaging said brackets, and springs to provide resilient shock absorbing connection between the tire structure and disc, and means for regulating the tension of said springs.

4. In a resilient wheel, a tire structure composed of a plurality of sections, connecting plates pivotally connecting the ends of said sections together, a hub structure including a disc, a pair of U shaped bolts connected to each of said tire sections and having legs positioned upon the opposite sides of said disc, springs about said legs, and means establishing connection between said legs and said disc to permit yieldable shock absorbing connection of the tire and hub structures.

In testimony whereof I affix my signature.

JOHN L. STOLTZ.